United States Patent
Kyrtsos et al.

(10) Patent No.: US 6,203,045 B1
(45) Date of Patent: Mar. 20, 2001

(54) SYSTEM FOR AUTOMATICALLY CONTROLLING WEIGHT DISTRIBUTION AMONG TRUCK AXLES

(75) Inventors: Christos Kyrtsos, Southfield; Dean Goodwin, Auburn Hills, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/199,011

(22) Filed: Nov. 23, 1998

(51) Int. Cl.⁷ .................................................. B62D 53/08
(52) U.S. Cl. ..................... 280/405.1; 280/407.1; 280/438.1
(58) Field of Search ............................ 280/405.1, 407, 280/407.1, 438.1, 439, 441, 441.1

(56) References Cited

U.S. PATENT DOCUMENTS

| | | | |
|---|---|---|---|
| 3,006,660 | * 10/1961 | Merz | 280/405.1 |
| 3,494,632 | * 2/1970 | Bostrom | 280/405.1 |
| 3,729,214 | * 4/1973 | Mulcahy et al. | 280/407 |
| 4,429,892 | * 2/1984 | Frampton et al. | 280/407 |
| 5,378,007 | * 1/1995 | Joyce | 280/433 |
| 5,610,372 | * 3/1997 | Phillips et al. | 177/25.14 |
| 5,863,057 | * 1/1999 | Wessels | 280/407.1 |

* cited by examiner

*Primary Examiner*—J. J. Swann
*Assistant Examiner*—Michael Cuff
(74) *Attorney, Agent, or Firm*—Carlson, Gaskey & Olds

(57) ABSTRACT

A control system and method provides automatic adjustments in a heavy duty vehicle that effectively redistributes the weight among the various wheel axles. A plurality of sensors are associated with the plurality of wheel axles on the vehicle. An electronic controller gathers information from the sensors and determines the weight at each wheel axle. The electronic controller then automatically determines adjustments that can be made to effectively redistribute the weight among the wheel axles in the event that the weight at any one axle is outside of a preselected range. The adjustments preferably are made by automatically moving the position of an adjustable "fifth wheel" relative to the cab portion. Additionally, this invention provides the capability of automatically adjusting the position of at least one trailer wheel axle. The adjustments can be made dynamically even while the vehicle is in motion.

21 Claims, 2 Drawing Sheets

SYSTEM FOR AUTOMATICALLY CONTROLLING WEIGHT DISTRIBUTION AMONG TRUCK AXLES

BACKGROUND OF THE INVENTION

This invention generally relates to a system for automatically distributing weight within a heavy duty vehicle among the various axles of the vehicle.

There are a variety of heavy duty vehicles available that are typically used to transport large loads. Although heavy duty vehicles vary in form, a common element in most of them is a "fifth wheel" that facilitates connecting a trailer portion to a cab portion of the truck. The position of the fifth wheel relative to the cab portion typically controls the spacing between the cab portion and the trailer portion of the truck.

Experienced vehicle operators understand that the position of the trailer portion relative to the cab portion is important for achieving satisfactory weight distribution of the load carried in the trailer portion. The problem is that only experienced drivers are capable of adequately adjusting the position of the trailer portion relative to the cab portion. Moreover, any such adjustments currently must be accomplished manually. Typically, a vehicle operator will have the trailer in a position and back the cab portion up into the trailer to jar the fifth wheel into a position where the desired spacing between the trailer portion and the cab portion is achieved. Moreover, this rather crude procedure virtually never provides an exact positioning of the trailer portion relative to the cab portion, but rather only provides approximate accuracy.

An additional difficulty is encountered while a vehicle is in route. Because of driving conditions, for example, the load within a trailer portion may shift while in transit. With currently available vehicles, there is no ability for a vehicle operator to readjust the position of the trailer portion relative to the cab portion while the vehicle is in motion. As noted above, a rudimentary, manual procedure is required to make any such adjustments. The conventional procedure requires that the trailer be fixed in a single position and, that obviously cannot be achieved while the vehicle is in motion.

There are a variety of reasons for maintaining a desired weight distribution among the axles of the vehicle including complying with state weight regulations and maintaining safe control over the vehicle while driving. For example, a total load within a vehicle may be within legal limits, however, the way that load is distributed among the axles may result in an infraction. Most states have weight limits at each axle and a poorly distributed weight may result in a ticket for a vehicle operator even though the total load within the vehicle is not excessive.

This invention provides an automated system for making adjustments in the position of the trailer portion relative to the cab portion for effectively redistributing the weight of a load among the various axles of the vehicle. This invention provides a unique and highly advantageous solution to the issues and difficulties described above.

SUMMARY OF THE INVENTION

In general terms, this invention is a system for automatically controlling weight distribution in a heavy duty vehicle. Most heavy duty vehicles have a plurality of wheel axles and an adjustable wheel that is used for connecting a cab portion to a trailer portion. The system designed according to this invention includes a plurality of sensors that provide information indicative of weight at each of the axles, respectively. An electronic controller is in communication with the sensors and determines the amount of weight at each of the axles. The controller also determines whether the weight at any one of the axles is outside of a preselected range. The controller then communicates with an automated moving device to automatically adjust the adjustable wheel and thereby redistribute the weight among the axles. The automatic adjustments according to the determinations made by the controller can effectively redistribute the weight among the wheel axles such that the weight at each axle is within the preselected range under most circumstances.

In the preferred embodiment, the system designed according to this invention includes a vehicle operator interface having a display that is controlled by the electronic controller. The operator has a visual indication of the proposed adjustments that the controller would make to redistribute the weight among the wheel axles. The vehicle operator is provided with at least one switch for authorizing the controller to instigate the proposed changes.

The preferred embodiment of this invention also includes at least one wheel axle on the trailer portion that is adjustable. The electronic controller determines when it would be useful to adjust the position of the adjustable trailer axle (alone or in combination with adjusting the position of the adjustable wheel) to assist in redistributing the weight among the wheel axles.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
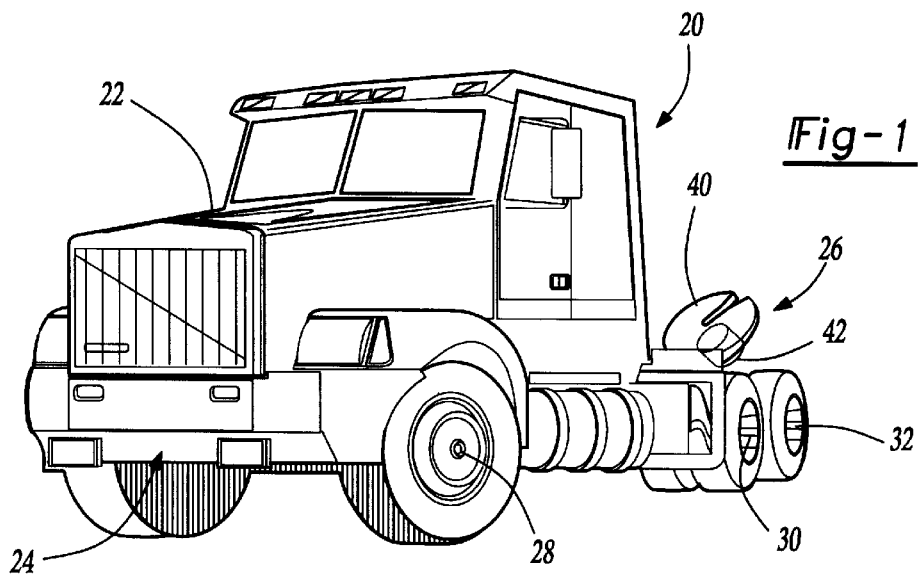
FIG. 1 diagrammatically illustrates selected portions of a heavy duty vehicle that includes a system designed according to this invention.

FIG. 1 diagrammatically illustrates selected portions of a heavy duty vehicle 20. A cab portion 22 has a front end 24 and a rear end 26. A plurality of wheel axles 28, 30 and 32 support the wheels and tires for driving the vehicle along a road surface. An adjustable wheel 40, which is commonly referred to as a "fifth wheel," facilitates connecting a trailer portion to the cab portion 22. A moving device is schematically illustrated at 42 that provides for automated movement of the adjustable wheel 40 into a plurality of positions relative to the cab portion 22.

Figure 2:
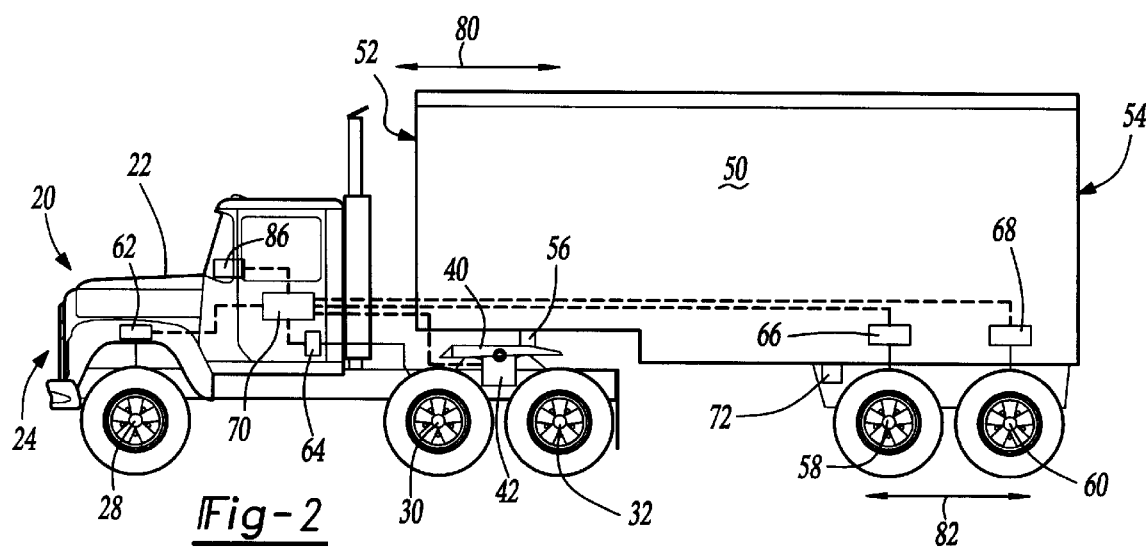
FIG. 2 diagrammatically illustrates a heavy duty vehicle including a control system designed according to this invention.

FIG. 2 diagrammatically illustrates a vehicle 20 including a trailer portion 50 connected with the cab portion 22. The trailer portion 50 includes a front end 52 and a rear end 54. A conventional connector 56 facilitates connecting the trailer portion to the cab portion by the interaction between the connector 56 and the adjustable wheel 40.

The trailer portion 50 includes a wheel axle 58 and a wheel axle 60. Accordingly, the heavy duty vehicle includes a plurality of wheel axles, some of which are associated with the cab portion 22 and some of which are associated with the trailer portion 50.

A plurality of sensors are associated with the wheel axles for detecting information at each of the wheel axles. The detected information is indicative of the weight at each axle. The embodiment of FIG. 2 schematically illustrates a sensor 62 associated with the wheel axle 28, a sensor 64 associated with the axles 30 and 32, a sensor 66 associated with the axle 58 and a sensor 68 associated with the axle 60. In the preferred embodiment, the sensors 62–68 are accelerometers that detect an amount of generally vertical acceleration at each wheel axle relative to a road surface, for example. The amount of vertical acceleration is indicative of the amount of weight at each of the axles.

The information from the sensors 62–68 is communicated to an electronic controller 70. A conventional microprocessor can be used for the electronic controller 70. Given this description, those skilled in the art will be able to choose from commercially available microprocessors or to custom design electronics and software to accomplish the results provided by this invention. The electronic controller 70 processes the information from the sensors 62–68 and determines the amount of weight at each of the wheel axles, respectively.

The electronic controller 70 preferably includes a dynamic vehicle model within memory and is programmed to utilize the dynamic vehicle model as part of the weight determinations. Dynamic vehicle models are known in the art and, for example, have been developed by the University of Michigan Transportation Research Institute, the Massachusetts Institute of Technology and Ohio State University.

The electronic controller 70 preferably determines the weight at each of the vehicle axles and determines what adjustments can be made to the vehicle 20 to effectively redistribute the weight among the various wheel axles. The electronic controller 70 communicates with the mover 42 so that an automatic adjustment of the position of the adjustable wheel 40 relative to the cab portion 20 can be accomplished. The mover 42 is responsive to commands from the electronic controller 70.

Additionally, the electronic controller 70 communicates with an axle mover 72, which is responsible for moving the wheel axle 58 into a plurality of positions relative to the trailer portion 50. The electronic controller 70 preferably selectively dictates movement of the adjustable wheel 40 and/or the wheel axle 58 to effectively redistribute the weight among the wheel axles. Movement of the adjustable wheel 40 results in moving the trailer portion 50 relative to the cab portion 20 as illustrated by the arrows 80 in FIG. 2. Similarly, movement of the wheel axle 58 preferably adjusts the spacing between the wheel axles 58 and 60 by moving the wheel axle 58 as schematically illustrated by the arrows 82 in FIG. 2.

Figure 3:
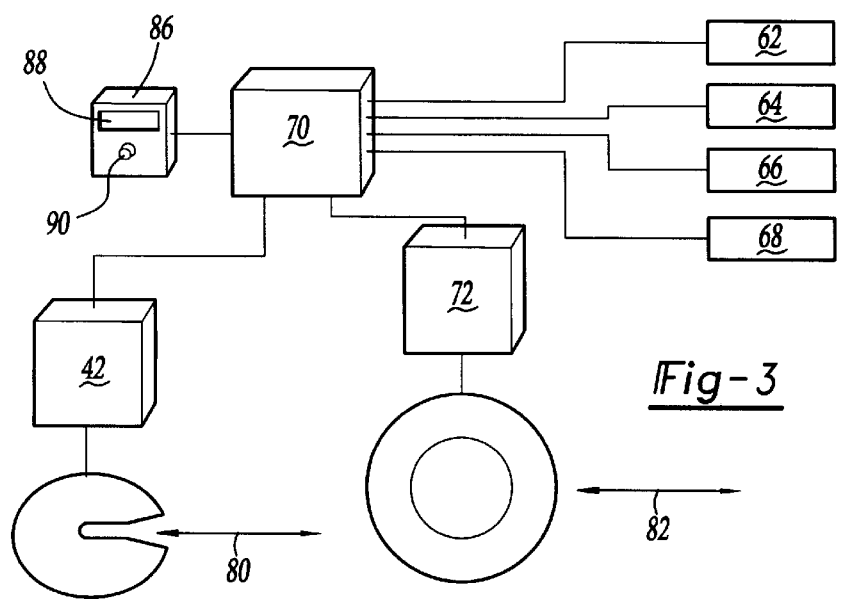
FIG. 3 schematically illustrates a control system designed according to this invention.

The preferred embodiment of this invention also provides an operator interface 86 that is supported within the cab portion 22. Referring to FIG. 3, the operator interface 86 preferably includes a display portion 88 and at least one operator switch 90. The display portion 88 preferably graphically illustrates to the operator the adjustments that can be made as determined by the electronic controller 70. Additionally, the display preferably indicates the current weight at each axle. In the preferred embodiment, the vehicle operator is given the option of authorizing the electronic controller to effect the proposed adjustments. The operator operates the switch 90 to provide an authorization signal to the electronic controller 70, which then instructs the movers 42 and 72 to make the adjustments that the electronic controller has determined is necessary. In one example, the operator can authorize adjustment of the wheel 40 or the axle 50 independent of each other.

Importantly, the adjustments are made automatically. Moreover, this invention provides the ability to make such adjustments even while the vehicle is in motion so that dynamic adjustment capabilities are realized. Even under conditions where a load shifts within a vehicle or road conditions cause an effective shifting of the weight distribution, this invention provides the ability to effectively redistribute the weight among the wheel axles, even while the vehicle is in motion.

This invention is useful not only for ensuring that legal load limits are satisfied at each of the axles but also provides the advantage of minimizing or maximizing loading on certain axles under certain conditions. For example, by redistributing the weight among the axles, it is possible to achieve better stopping performance or better pulling performance while going up a hill, for example. Additionally, this invention provides the ability to make such adjustments dynamically even while the vehicle is in motion.

In one example, the method of utilizing the system designed according to this invention is to employ the sensors and the electronic controller to determine the weight at each of the axles. If the weight at any one of the axles exceeds a maximum limit, the electronic controller commands the mover 42 (and/or 72) to make an adjustment to effectively redistribute the weight among the wheel axles. The electronic controller 70 then continuously monitors the wheel axles and any time the weight at any one of the axles is outside of a preselected range, further adjustments are made. The controller 70 preferably continuously monitors the weight distribution.

Figure 4:
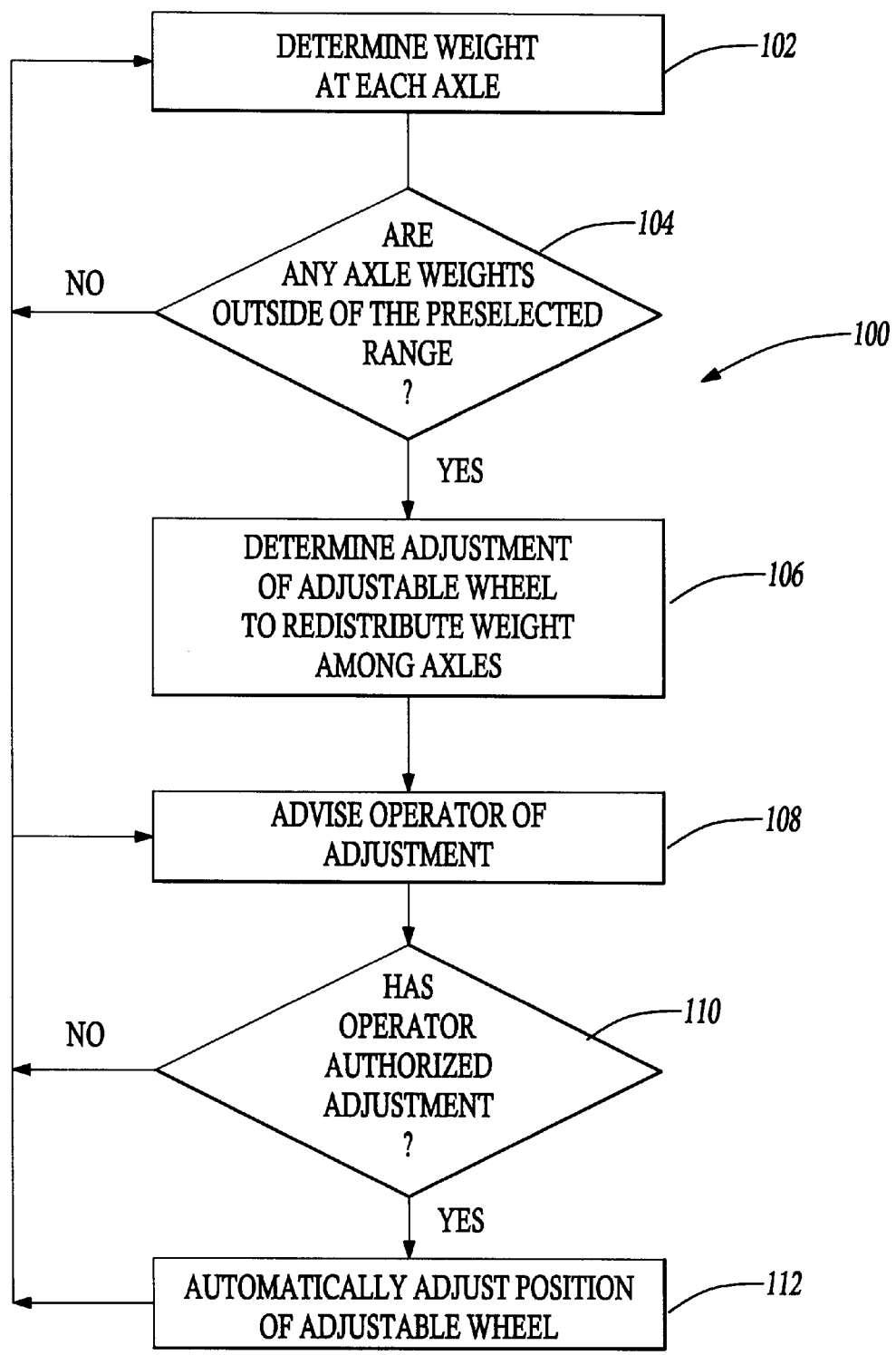
FIG. 4 illustrates, in flow chart form, the method of this invention.

FIG. 4 includes a flow chart 100 illustrating the preferred method of this invention. At 102, the electronic controller 70 determines the weight at each axle based upon the information gained from the sensors 62–68. At 104, the electronic controller 70 determines whether any of the wheel axle weights are outside of a preselected range. The preselected range preferably is determined based upon the legal load limits per axle mandated by the various state highway authorities. If none of the axle weights are outside of the preselected range then the controller 70 continues to monitor the weights at each of the axles. When at least one of the weights is outside of the preselected range then the controller determines the adjustment to be made at 106. The adjustment, if any, preferably minimizes the amount of weight over the permissible limit, which can reduce any infractions. As indicated above, the preferred embodiment includes the ability to adjust the position of the adjustable wheel 40 and/or the position of the trailer wheel axle 58 to accomplish the desired redistribution of the weight among the various wheel axles.

In the preferred embodiment, the vehicle operator is advised at 108 of the proposed adjustment that the electronic controller 70 has determined should be made to redistribute the weight among the wheel axles. At 110, the controller 70 determines whether the operator has authorized the proposed adjustment (or a portion of the proposed adjustment). If the operator has not authorized the adjustment, the controller 70 continues to wait for authorization from the operator while also continuing to monitor the weight at each wheel axle at 102. If the operator provides an authorization to make the adjustment, for example, by manipulating the switch 90, the controller 70 automatically instigates the adjustment at 112. As noted above, the adjustments can include moving the position of the adjustable wheel 40, which readjusts the spacing between the cab portion 22 and the trailer portion 50, and/or adjusting the position of the wheel axle 58, which results in different spacing between the trailer wheel axles 58 and 60.

In one example embodiment, even though the controller 70 normally waits for an authorization signal from the operator, an override function is included. Under some circumstances, the electronic controller 70 is programmed to make an adjustment even without authorization from the operator if certain conditions are met. For example, there may be adjustments that should be made for safety reasons and the controller 70 instigates the necessary adjustments even without waiting for authorization from the vehicle operator. It is within the scope of this invention to automatically make adjustments without ever requiring an authorization from the vehicle operator.

The description just given provides details regarding the currently preferred embodiment of this invention. Variations and modifications may become apparent to those skilled in the art that do not necessarily depart from the purview and spirit of this invention. The scope of legal protection provided to this invention can only be determined by studying the following claims.

What is claimed is:

1. A system for controlling weight distribution in a heavy duty vehicle having a plurality of wheel axles and an adjustable wheel that is used for connecting a cab portion to a trailer portion, comprising:
   a plurality of sensors, each associated with at least one of the axles, that gather information indicative of an amount of weight at each of the axles, respectively;
   a controller in communication with the sensors that determines the amount of weight at each of the axles, respectively, and determines whether a weight at any one of the axles is outside of a preselected range; and
   a mover that automatically adjusts the adjustable wheel to thereby redistribute the weight among the axles responsive to the controller.

2. The system of claim 1, wherein the controller dynamically adjusts the adjustable wheel while the vehicle is in motion.

3. The system of claim 1, wherein the adjustable wheel is adjusted in a first direction to move the adjustable wheel closer to a front of the vehicle and in a second direction to move the adjustable wheel further from the front of the vehicle and wherein the mover moves the adjustable wheel in the first or second direction responsive to the controller.

4. The system of claim 1, wherein the preselected range includes a maximum value that is determined based upon legal load limits per axle.

5. The system of claim 1, wherein the vehicle includes a plurality of trailer axles and at least one of the trailer axles is moveable into a plurality of positions relative to the trailer and further comprising a trailer axle mover that moves the moveable trailer axle responsive to the controller.

6. The system of claim 5, wherein the controller communicates with the mover of the adjustable wheel and the trailer axle mover to cause the movers to automatically adjust positions to thereby achieve a desired weight distribution among the axles of the vehicle.

7. The system of claim 1, further comprising a vehicle operator interface having at least one switch that is selectively activated by the operator to generate a signal and an indicator that provides an indication to the operator of the adjustment that the controller has determined to make and wherein the controller responds to the signal generated by the operator using the interface switch before communicating with the mover to automatically move the adjustable wheel.

8. The system of claim 1, wherein each of the plurality of sensors comprises an accelerometer that detects an amount of generally vertical acceleration of each of the axles away from a road surface.

9. A heavy duty vehicle, comprising:
   a cab portion having a front end and a rear end;
   a steering axle near the cab portion front end;
   a second axle near the cab portion rear end;
   an adjustable wheel supported near the cab portion rear end that is adjustable into a plurality of positions relative to the cab portion;
   a trailer portion having a front end and a rear end;
   a connector near the front end of the trailer portion that is received by the adjustable wheel to connect the trailer portion to the cab portion;
   a trailer axle near the trailer portion rear end;
   a plurality of sensors, each associated with at least one of the axles, that detect an amount of weight at each of the axles, respectively;
   a controller in communication with the sensors that determines the amount of weight at each of the axles, respectively, and determines whether a weight at any one of the axles is outside of a preselected range; and
   a mover that automatically adjusts the position of the adjustable wheel to thereby redistribute the weight among the axles responsive to the controller.

10. The vehicle of claim 9, wherein the controller dynamically adjusts the adjustable wheel while the vehicle is in motion.

11. The vehicle of claim 9, wherein the preselected range includes a maximum value that is determined based upon legal load limits per axle.

12. The vehicle of claim 9, further comprising a second trailer axle and wherein at least one of the trailer axles is moveable into a plurality of positions relative to the trailer and further comprising a trailer axle mover that moves the moveable trailer axle responsive to the controller.

13. The vehicle of claim 12, wherein the controller communicates with the mover of the adjustable wheel and the trailer axle mover to cause the movers to automatically adjust positions to thereby achieve a desired weight distribution among the axles of the vehicle.

14. The vehicle of claim 9, further comprising a vehicle operator interface supported in the cab portion and having at least one switch that is selectively activated by the operator to generate a signal and a display that provides a display to the operator indicating the weight at the axles and wherein the controller responds to the signal generated by the operator using the interface switch before communicating with the mover to automatically move the adjustable wheel.

15. The vehicle of claim 9, wherein each of the plurality of sensors comprises an accelerometer that detects an amount of generally vertical acceleration of each of the axles away from a road surface.

16. A method of controlling weight distribution on a heavy duty vehicle having a plurality of wheel axles and an adjustable wheel, comprising the steps of:
   (A) detecting an amount of weight at each of the axles, respectively;

(B) determining whether the weight at any of the axles is outside of a preselected range; and (C) automatically adjusting a position of the adjustable wheel to thereby effectively redistribute the weight among the axles.

17. The method of claim 16, further comprising continually adjusting the position of the adjustable wheel until the weight at each of the axles is within the preselected range.

18. The method of claim 16, wherein steps (B) and (C) are performed dynamically while the vehicle is in motion.

19. The method of claim 16, wherein step (B) includes determining the weight at a selected one of the axles and step (C) includes automatically adjusting the position of the adjustable wheel a selected amount and wherein the method further comprises reperforming steps (B) and (C) until the weight at the selected axle is within the preselected range.

20. The method of claim 16, wherein the vehicle further includes at least one trailer axle that is adjustable into a plurality of positions relative to a trailer portion of the vehicle and the method further comprises automatically adjusting a position of the adjustable trailer axle to thereby effectively redistribute the weight among the axles.

21. A system for controlling weight distribution in a heavy duty vehicle having a plurality of wheel axles and an adjustable wheel that is used for connecting a cab portion to a trailer portion, comprising:

a plurality of sensors that each comprise an accelerometer, each associated with at least one of the axles, that detects an amount of generally vertical acceleration of each of the axles away from a road surface, the sensors gathering information indicative of an amount of weight at each of the axles, respectively;

a controller in communication with the sensors that determines the amount of weight at each of the axles and determines whether a weight at any one of the axles is outside of a pre-selected range; and a mover that automatically adjusts the adjustable wheel to thereby redistribute the weight among the axles responsive to the controller.

* * * * *